United States Patent
Blanchet et al.

(10) Patent No.: US 9,385,380 B2
(45) Date of Patent: Jul. 5, 2016

(54) FUEL CELL HUMIDIFICATION MANAGEMENT METHOD AND SYSTEM

(71) Applicant: Nuvera Fuel Cells, Inc., Billerica, MA (US)

(72) Inventors: Scott Blanchet, Chelmsford, MA (US); Filippo Gambini, Boston, MA (US)

(73) Assignee: Nuvera Fuel Cells, Inc., Billerica, MA (US)

( * ) Notice: Subject to any disclaimer, the term of this patent is extended or adjusted under 35 U.S.C. 154(b) by 274 days.

(21) Appl. No.: 14/041,557

(22) Filed: Sep. 30, 2013

(65) Prior Publication Data

US 2014/0120436 A1 May 1, 2014

Related U.S. Application Data

(60) Provisional application No. 61/721,265, filed on Nov. 1, 2012.

(51) Int. Cl.
| | | |
|---|---|---|
| *H01M 8/04* | (2016.01) | |
| *B01B 1/00* | (2006.01) | |
| *H01M 8/00* | (2016.01) | |

(52) U.S. Cl.
CPC .......... *H01M 8/04141* (2013.01); *B01B 1/005* (2013.01); *H01M 8/006* (2013.01); *H01M 8/04291* (2013.01); *H01M 8/04313* (2013.01); *H01M 8/04358* (2013.01); *H01M 8/04507* (2013.01); *H01M 8/04611* (2013.01); *H01M 8/04835* (2013.01); *H01M 8/0432* (2013.01); *H01M 8/0435* (2013.01); *H01M 8/04343* (2013.01); *H01M 8/04492* (2013.01); *H01M 8/04641* (2013.01); *Y02E 60/50* (2013.01)

(58) Field of Classification Search
CPC ....................... H01M 8/04492; H01M 8/04507
See application file for complete search history.

(56) References Cited

U.S. PATENT DOCUMENTS

| | | | |
|---|---|---|---|
| 2003/0039875 A1* | 2/2003 | Horiguchi ........... | H01M 8/0206 429/437 |
| 2006/0134474 A1* | 6/2006 | Toth .................. | H01M 8/04141 429/414 |
| 2007/0087238 A1 | 4/2007 | Inai et al. | |
| 2011/0113857 A1 | 5/2011 | Sinha | |

FOREIGN PATENT DOCUMENTS

| | | |
|---|---|---|
| WO | WO 2006/069070 A2 | 6/2006 |
| WO | WO 2009/075491 A2 | 6/2009 |

OTHER PUBLICATIONS

Xingsheng Lao et al., "Comparative Study of Membrane Humidifier and Enthalpy Wheel Humidifier for Large Power Fuel Cell System", *Journal of Fuel Cell Science and Technology*; Feb. 2009, vol. 6., No. 1, pp. 14501-1.

International Search Report and Written Opinion from International Application No. PCT/US2013/062655 dated Jan. 31, 2014.

* cited by examiner

*Primary Examiner* — Jane Rhee
(74) *Attorney, Agent, or Firm* — Finnegan, Henderson, Farabow, Garrett & Dunner LLP.

(57) ABSTRACT

A method of managing humidification for a fuel cell power system comprising, supplying air to a cathode inlet stream of a fuel cell. Detecting a fuel cell parameter associated with the humidity of the cathode inlet stream. Selectively operating the fuel cell in either an active humidification mode or a deactive humidification mode based on the fuel cell parameter, wherein the active humidification mode includes adding water to the cathode inlet stream and the deactive humidification mode includes adding no water to the cathode inlet stream.

21 Claims, 7 Drawing Sheets

FUEL CELL HUMIDIFICATION MANAGEMENT METHOD AND SYSTEM

This patent application claims the benefit of priority under 35 U.S.C. §120 to U.S. Provisional Application No. 61/721,265, filed on Nov. 1, 2012, the entirety of which is incorporated herein by reference.

The present disclosure is directed towards humidification management for fuel cells, and more particularly, humidification management of fuel cells used in power systems.

A fuel cell is a device used for generating electric current from chemical reactions. Fuel cell technology offers a promising alternative to traditional power sources for a range of technologies, for example, transportation vehicles and portable power supply applications. A fuel cell converts the chemical energy of a fuel (e.g., hydrogen, natural gas, methanol, gasoline, etc.) into electricity through a chemical reaction with oxygen or other oxidizing agent. The chemical reaction typically yields electricity, heat, and water. A basic fuel cell comprises a negatively charged anode, a positively charged cathode, and an ion-conducting material called an electrolyte.

Different fuel cell technologies utilize different electrolyte materials. A Proton Exchange Membrane (PEM) fuel cell, for example, utilizes a polymeric ion-conducting membrane as the electrolyte. In a hydrogen PEM fuel cell, hydrogen atoms are electrochemically split into electrons and protons (hydrogen ions) at the anode. The electrochemical reaction at the anode is $2H_2 \rightarrow 4H^+ + 4e^-$.

The electrons produced by the reaction flow through an electric load circuit to the cathode, producing direct-current electricity. The protons produced by the reaction diffuse through the electrolyte membrane to the cathode. An electrolyte can be configured to prevent the passage of negatively charged electrons while allowing the passage of positively charged ions.

Following passage of the protons through the electrolyte, the protons can react at the cathode with electrons that have passed through the electric load circuit. The electrochemical reaction at the cathode produces water and heat, as represented by the exothermic reaction: $O_2 + 4H^+ + 4e^- \rightarrow 2H_2O$.

In operation, a single fuel cell can generally generate about 1 volt. To obtain the desired amount of electrical power for a particular application, individual fuel cells are combined to form a fuel cell stack. The fuel cells are stacked together sequentially, each cell including a cathode, an electrolyte membrane, and an anode. Each cathode/membrane/anode assembly constitutes a "membrane electrode assembly" (MEA), which is typically supported on both sides by bipolar plates. Gases (hydrogen and air) are supplied to the electrodes of the MEA through channels or grooves formed in the plates, which are known as flow fields. In addition to providing mechanical support, the bipolar plates (also known as flow field plates or separator plates) physically separate individual cells in a stack while electrically connecting them. The bipolar plates also act as current collectors, provide access channels for the fuel and the oxidant to the respective electrode surfaces, and provide channels for the removal of water formed during operation of the fuel cell. The water formed from the cathode reaction must be continuously removed from the cathode to facilitate additional reaction. The water can be removed from the cathode in the form of exhaust gas moisture.

In a proton exchange membrane (PEM) fuel cell, the polymeric ion-conducting membrane acting as the electrolyte requires a certain level of humidity to facilitate conductivity of the membrane. A major challenge for optimum fuel cell performance is maintaining proper membrane humidity of the PEM fuel cell. A PEM membrane that is less than fully hydrated can cause a decrease in protonic conductivity and may result in resistive loss, decreased power output, and decreased membrane life. On the other hand, the presence of too much water in the membrane may flood the membrane, potentially blocking flow channels through the membrane and negatively affecting fuel cell performance and operational lifetime. Reactants, for example, air containing hydrogen and oxygen, entering a fuel cell may vary in temperature and humidity, and thus may affect the membrane and the performance of a PEM fuel cell.

For a PEM fuel cell to operate efficiently and produce maximum output power, the PEM fuel cell should be properly humidified. Humidifying the cathode inlet air allows PEM fuel cells to operate at higher temperatures and produce greater power output. Output power demand in fuel cells used in automotive applications can change rapidly depending on road conditions and driver demand. Unfortunately, during partial load conditions or less than maximum power output conditions, humidification reduces efficiency as a result of parasitic power losses. Frequently, a PEM fuel cell will be operating at less than maximum output power or under a partial load condition. Therefore, a need exists for an efficient method of humidification management.

In consideration of the aforementioned circumstances, the present disclosure provides a method and system for humidification management of fuel cell power systems.

One aspect of the present disclosure is directed to a method of managing humidification for a fuel cell power system, comprising: supplying air to a cathode inlet stream of a fuel cell; detecting a fuel cell parameter associated with the humidity of the cathode inlet stream; and selectively operating the fuel cell in either an active humidification mode or a deactive humidification mode based on the fuel cell parameter, wherein the active humidification mode includes adding water to the cathode inlet stream and the deactive humidification mode includes adding no water to the cathode inlet stream.

Another aspect of the present disclosure is directed to a fuel cell humidification management system, comprising: an air supply conduit configured to supply air to a fuel cell; a humidification device configured to supply a flow of water to the air supply conduit; and a controller configured to detect a fuel cell parameter and only activate or deactivate the humidification device based on the fuel cell parameter.

Another aspect of the present disclosure is directed to a fuel cell having a humidification management system, comprising: an air supply; a fuel cell comprising a cathode, an anode, and an electrolyte; and a humidification device operated by a binary control configured to switch between an active and deactive humidification mode based on at least one fuel cell parameter and fuel cell parameter threshold, wherein the humidification device is configured to humidify a cathode inlet stream generated by the air supply and fed to the cathode when in the active humidification mode.

It is to be understood that both the foregoing general description and the following detailed description are exemplary and explanatory only and are not restrictive of the disclosure, as claimed.

The accompanying drawings, which are incorporated in and constitute a part of this specification, illustrate embodiments of the present disclosure and together with the description, serve to explain the principles of the disclosure.

Reference will now be made in detail to the present exemplary embodiments of the disclosure, examples of which are illustrated in the accompanying drawings. Wherever possible, the same reference numbers will be used throughout the drawings to refer to the same or like parts.

The present disclosure is described herein with reference to illustrative embodiments for particular applications, such as, for example, a humidification system for automotive PEM fuel cells. It is understood that the embodiments described herein are not limited thereto. Those having ordinary skill in the art and access to the teachings provided herein will recognize additional modifications, applications, embodiments, and substitution of equivalents that all fall within the scope of the present disclosure. For example, the principles described herein may be used with any suitable PEM fuel cell for any suitable application (e.g., automotive, portable, industrial, stationary, backup power or mobile device fuel cell applications). Accordingly, the present disclosure is not limited by the foregoing or following descriptions.

Figure 1:
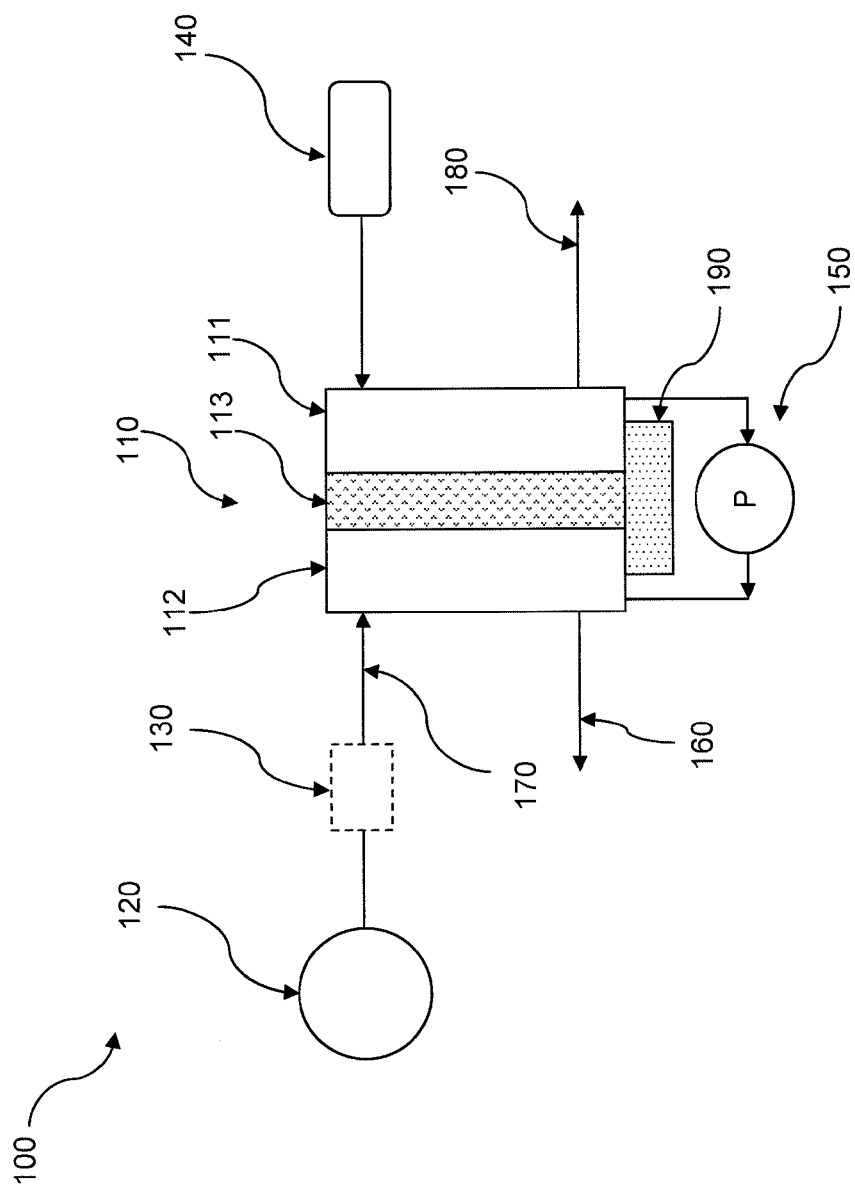
FIG. 1 is a schematic diagram of part of a fuel cell power system, according to an exemplary embodiment.

FIG. 1 is a schematic diagram of a power system 100, according to an exemplary embodiment. Power system 100 can comprise a fuel cell 110, an air supply 120, a humidification device 130, a fuel 140, and an electric circuit 150. Fuel 140 can comprise a variety of fuels, such as, hydrogen, carbon monoxide, methanol, or dilute light hydrocarbons like methane. Fuel cell 110 can comprise an anode 111, a cathode 112, and a proton exchange membrane (PEM) 113. Fuel 140 can be fluidly connected to fuel cell 110, and fuel 140 can be supplied to anode 111 where the atoms of fuel 140 are electrochemically split into electrons and protons. The electrons flow through electric circuit 150 to cathode 112 and generate electricity in the process, while the protons move through PEM 113 to cathode 112. At cathode 112, protons combine with electrons and react with oxygen supplied by air supply 120 to produce water and heat.

Fuel cell 110 can comprise a PEM fuel cell with an open flow field design. Open flow field fuel cells are described in commonly assigned U.S. Patent Appln. Pub. No. 2011/0223514, which is herein incorporated by reference in its entirety. The open flow field design can allow the water produced at cathode 112 to flow back and humidify PEM 113, in effect, fuel cell 110 can self humidify PEM 113. A properly humidified PEM 113 can operate efficiently and provide adequate conductivity for ion transfer. If PEM 113 is less than properly humidified the electrochemical reactions will be impeded and less electricity will be produced. PEM 113 can dry out and become damaged if not properly humidified. In addition, too much water at PEM 113 can also cause problems Excess water produced at cathode 112 can be removed from fuel cell 110 by way of cathode outlet stream 160. Air supply 120 can be supplied to the cathode by way of cathode inlet stream 170. Cathode inlet stream 170 can pass through humidification device 130 en route to cathode 112. In addition, fuel 140 unused in anode 111 can exit fuel cell 110 by way of anode outlet stream 180. The unused fuel 140 can be recycled to increase overall power system efficiency.

If fuel cell 110 is unable to generate enough electrical power to support a given application, fuel cell 110 can be stacked (not shown) with a plurality of fuel cells to form a fuel cell stack.

Air supply 120 can include one or more air compressors. Air supply 120 can regulate the air pressure and flow of air traveling into fuel cell 110 to limit or prevent damage. Air supply 120 can include any suitable number or type air compressors, such as, for example, reciprocating, rotary screw, single stage, or multi stage. In some embodiments, air supply 120 may receive and compress air from a source exterior to power system 100. For example, air supply 120 may couple to a reactant source (not shown) configured to deliver air to air supply 120, or may draw in air from the surrounding environment. In some embodiments (not shown), air supply 120 may be configured to recycle air exiting cathode 112 by way of cathode outlet stream 160 so that it is re-delivered into power system 100.

In some embodiments, the source from which air supply 120 derives air may vary according to one or more factors, for example, availability, temperature, pressure, or humidity. The variability in the source for air supply 120 can lead to variability in the air supplied to cathode 112. In some embodiments, air supply 120 may be configured to accept air from one or more of these sources. Air supply 120 can accept ambient air from an environment about fuel cell 110. Ambient air can have between 0-100 percent relative humidity, as measured at the temperature of the ambient air.

Humidification device 130 can be fluidly connected to cathode inlet stream 170 between air supply 120 and cathode 112 inlet. Humidification device 130 can be configured to operate in only one of two modes, wherein one mode is active and one mode is deactive (i.e., on or off). When operating in active humidification mode, humidification device 130 can be configured to add water to cathode inlet stream 170, raising humidity of air supplied to cathode 112. When operating in active humidification mode, humidification device 130 can add a flow rate of water to achieve a relative humidity of the cathode inlet stream 170 greater than about 49% when evaluated at the cathode 112 inlet temperature. In various embodiments, the relative humidity of about 49% can range +/−1%, 2%, 5%, or 10%. When operating in deactive humidification mode, humidification device 130 can be configured to add little or no water to the cathode inlet stream 170. Humidification device 130 can be powered by electric circuit 150 or another alternative power source.

In various embodiments, a binary control can be used for switching humidification device 130 between active and deactive humidification mode. Under binary control, humidification device 130 when operating in active humidification mode, can be configured to only supply about 100% of flow capacity. While operating in deactive humidification mode, humidification device 130 can be configured to supply only about 0% of flow capacity. Therefore, binary control can be configured so humidification device 130 only supplies either about 0% flow (deactive mode) or about 100% flow (active mode). While operating in active humidification mode flow is substantially maintained at about 100% flow capacity. While operating in deactive humidification mode flow is substantially maintained at about 0% flow capacity.

In alternative embodiments (not shown), humidification device 130 can be integrated into fuel cell 110 or a fuel cell stack making it a single device. Integrated humidification can comprise additional plates assembled into the fuel cell or fuel cell stack. The additional plates can separate the stack into fuel cell zones and humidification zones. The humidification zones can include a hydrophilic membrane that can allow coolant water to permeate through the membrane and humidify the gas in the adjacent zone. Activating and deactivating the humidification can comprise controlling the coolant water. The integrated humidification can reduce the space requirements and the amount of interconnecting hardware. In addition, an integrated controller can be configured to detect a fuel cell parameter and control the humidification mode based on the fuel cell parameter.

As described above, several reactions occur within fuel cell 110. Protons and electrons combine at cathode 112, then react with oxygen to produce water and heat. The heat produced can be removed from fuel cell 110 by a variety of mechanisms. For example, the fuel cell can include coolant channels that allow the flow of coolant fluid to remove the heat from the fuel cell and expel the heat externally. In addition a heat exchanger 190 can be used to expel the excess heat generated. Heat exchanger 190 can comprise, for example, a shell and tube, plate, plate and shell, or plate and fin heat exchanger. Heat exchanger 190 can be adjacent to fuel cell 110 so the heat generated travels to heat exchanger by means of conduction. An alternative arrangement can include having a coolant fluid flow through fuel cell 110 and carry the excess heat to heat exchanger 190 where it can be expelled.

The operating temperature of fuel cell 110 can be dependent on several factors, including ambient temperature, fuel cell power output, fuel cell construction, and heat exchanger 190 design. For example, if the ambient temperature is high, fuel cell 110 temperature will be correspondingly higher in order for heat exchanger 190 to reject a given amount of heat to the surrounding atmosphere. In contrast, if the ambient temperate is low, fuel cell 110 temperature will be correspondingly lower in order for heat exchanger 190 to reject a given amount of heat to the surrounding atmosphere. Changes in ambient temperature typically occur gradually due to the nature of weather.

The amount of power output from fuel cell 110 through electric circuit 150 can affect the operating temperature of fuel cell 110. For example, more power requires increased anode and cathode reactions, increasing heat generation. Unlike ambient temperature changes, which typically happen gradually, power output changes can occur rapidly. For example, a fuel cell powering a vehicle can expect rapid changes in required power output when the vehicle is in traffic requiring the vehicle to speed up and slow down repeatedly. In contrast, a vehicle driving at steady speed, on an open road, would not experience substantial variation in the power output from the fuel cell.

Power system 100 under normal operating conditions can operate with deactive humidification mode selected because humidifying cathode inlet stream 170 under normal operating conditions is unnecessary and inefficient due to the parasitic power loss. However, normal operating conditions for fuel cell 110 can be exceeded, if for example, either the ambient temperature or the power output rises to sufficient levels. When normal operating conditions are exceeded, fuel cell 110 operating parameters can change. For example, operating temperature of fuel cell 110 can increase because heat exchanger 190 can no longer remove heat at the rate it is being generated. Heat exchanger 190 size can be increased, however the size of heat exchanger 190 can become unreasonable for effective packaging on the target vehicle or power system.

A target temperature for fuel cell 110 operation can be calculated by considering the construction, design, and application (i.e., material of construction, flow field design, etc.) of fuel cell 110, size/performance of heat exchanger 190, and fuel cell 110 performance. The target temperature can represent the temperature threshold at which self humidification of PEM 113 by the water generated at the cathode 112 can no longer adequately humidify PEM 113 because the rate of water vapor lost through cathode outlet stream 160 is greater than the rate of water generated by the fuel cell reactions.

Instead of increasing the size of heat exchanger 190 to stay below the temperature threshold of fuel cell 110, fuel cell 110 can operate at or above the temperature threshold by selecting active humidification mode. Active humidification mode can provide additional humidity to cathode 112 and PEM 113. The additional humidity can be provided by cathode inlet stream 170 when active humidification mode is selected. Operating above the temperature threshold can allow fuel cell 110 to output more power in addition to enabling fuel cell 110 to operate at higher ambient temperature conditions. Fuel cell 110 operating temperature is typically within a range of about 60 to about 95 degrees Celsius. Ambient temperature during fuel cell operation can be within a range from about −40 to about 60 degrees Celsius.

Figure 2:
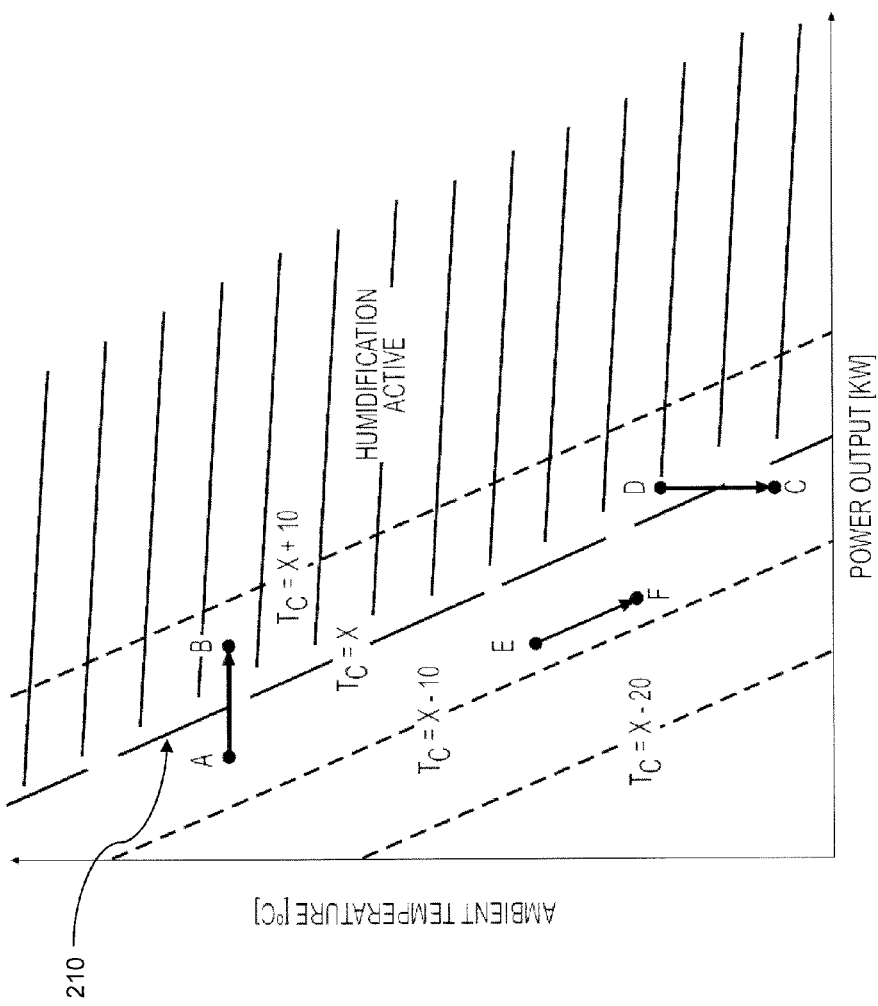
FIG. 2 is a graph illustrating the relationship between ambient temperature and fuel cell power out, according to an exemplary embodiment.

FIG. 2 is a graph illustrating a relationship between ambient temperature, fuel cell power output, and fuel cell operating temperature for fuel cell 110, according to an exemplary embodiment. Based on the design of fuel cell 110, at a given power output and given ambient temperature an operating point can be plotted on the graph. The operating point can correspond to an expected operating temperature for fuel cell 110.

A temperature threshold 210 can also be illustrated. The region to the right of temperature threshold 210 represents operating points at which it can be more efficient to select active humidification mode. The region to the left of temperature threshold 210 can represent operating points at which it can be more efficient to select deactive humidification mode. FIG. 2 illustrates that at lower power output, a higher ambient temperature can be tolerated while remaining below temperature threshold 210. In addition, at lower ambient temperature, a higher power output can be tolerated while remaining below temperature threshold 210.

When fuel cell 110 is operating at point A the ambient temperature can be relatively high, but the power output can be relatively low. At that operating point, fuel cell 110 operating temperature can be about 5 degrees Celsius below temperature threshold 210. If, for example, the power output by fuel cell 110 increases, the operating point of fuel cell 110 can move from point A to point B. The transition from point A to point B would cause fuel cell 110 operating temperature to increase and exceed temperature threshold 210. As described above when the operating temperature reaches and exceeds temperature threshold 210, self humidification of PEM 113 is no longer adequate. However, active humidification mode can be selected and the allowable operating temperature of fuel cell 110 can be increased to allow fuel cell 110 to operate at point B.

In an additional example, at point D the fuel cell's current operating temperature can exceed temperature threshold 210. Selecting active humidification mode can be beneficial to power system 100 efficiency. If the ambient temperature drops while the power output remains substantially constant, then fuel cell 110 operation point can move from point D to point C. Moving from point D to point C will decrease the operating temperature of fuel cell 110 below temperature threshold 210, making deactive humidification mode more efficient. In this example, not selecting deactive humidification mode when transitioning from point D to point C can create an inefficiency because self humidification of PEM 113 is sufficient and continuing to operate humidification device 130 can result in parasitic power loss.

Another example, at point E deactive humidification mode can be selected because the operating temperature is below temperature threshold 210. If the ambient temperature decreases and the power output increases fuel cell 110 state of operation can move from point E to point F. Despite the increase in power output humidification mode can remain deactive because the increase in power output was offset by the decrease in ambient temperature resulting in no change in the operating temperature of fuel cell 110.

The majority of the time during normal operation, the operating point for fuel cell 110 can be below temperature threshold 210. Therefore, the majority of the time the humidification mode selected can be deactive. Deactive humidification mode is beneficial because with humidification device 130 deactivated the parasitic power loss can be reduced or eliminated. Whereas, if humidification device 130 remains active continuously or for a substantial amount of time, the partial load conditions (i.e., conditions below temperature threshold 210) reduce power system 100 efficiency.

Figure 3:
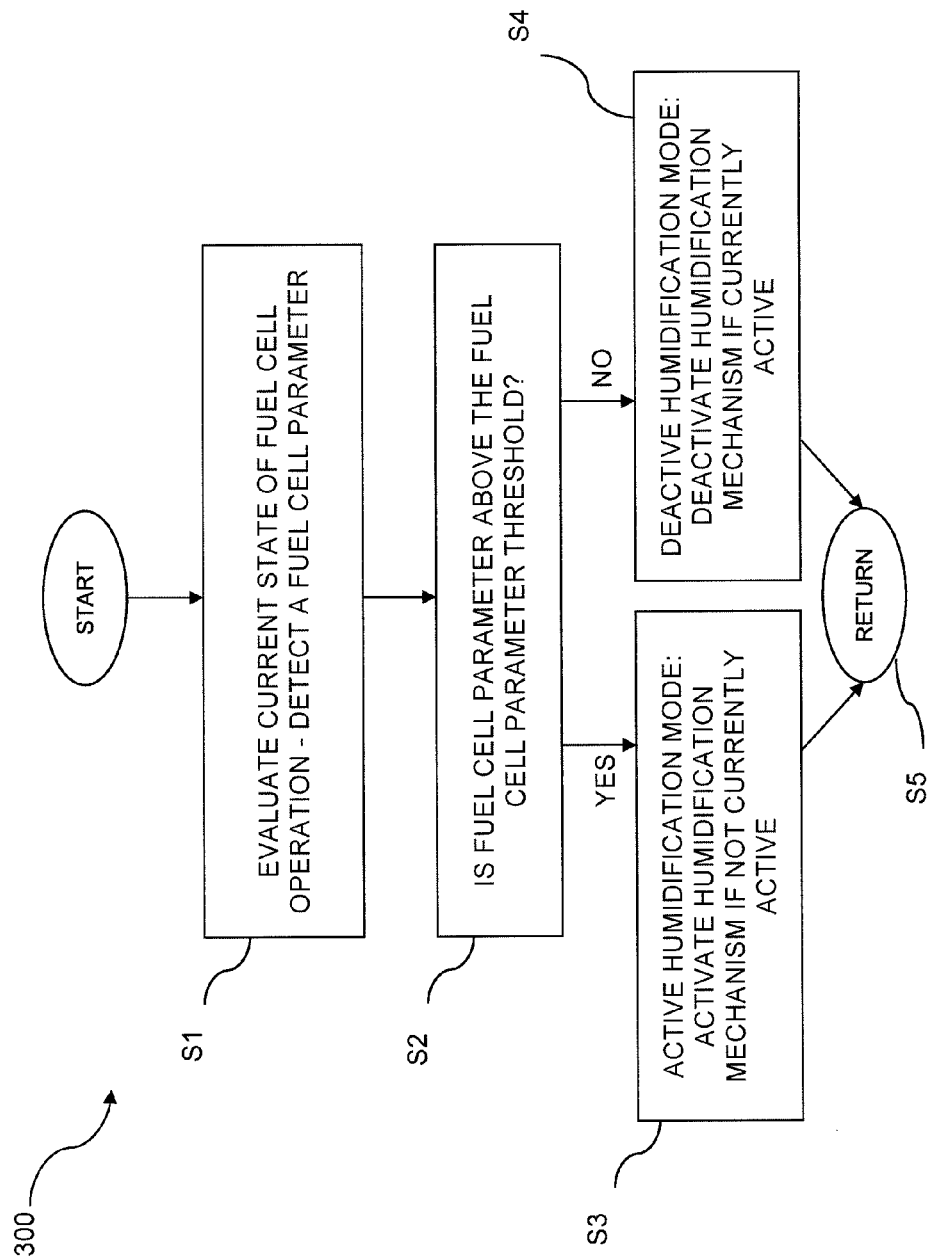
FIG. 3 is a flow diagram illustrating a method of humidification management, according to an exemplary embodiment.

FIG. 3 shows a flow chart 300, for a method of humidification management for fuel cell power system 100, in accordance with various embodiments. In step S1, an evaluation of power system 100 current state of operation can be conducted. Evaluating the current state of operation can comprise detecting a fuel cell parameter that can be a fuel cell temperature, a fuel cell coolant temperature, a fuel cell cathode outlet stream temperature, a fuel cell power output, a fuel cell load, a cathode outlet stream humidity, a fuel cell resistance, or an ambient temperature. A fuel cell parameter threshold can be established for any of the fuel cell parameters.

After completing step S1, the next step S2, comprises determining whether the fuel cell parameter detected in step S1 is currently above or below the fuel cell parameter threshold for the corresponding parameter. This can include, for example, comparing the current fuel cell 110 temperature to temperature threshold 210.

If the fuel cell parameter detected is above the corresponding fuel cell parameter threshold, then step S3 can include selecting active humidification mode. Selecting active humidification mode can comprise activating humidification device 130 if it is not already active. If the fuel cell parameter detected is below the corresponding fuel cell parameter threshold, then step S4 can include selecting deactive humidification mode. Selecting deactive humidification mode can comprise deactivating humidification device 130 if it is currently active. Following the completion of either step S3 or S4, the flow chart can proceed to step S5, which comprises returning to the start of the flow chart so the steps can be repeated.

The rate at which steps S1-S5 are repeated can be adjusted. For example, if better efficiency is desired then the cycle rate for steps S1-S5 can be increased to minimize the amount of time during which active humidification mode is selected when it is not beneficial. For example, if the steps are repeated every 60 seconds then deactive humidification mode will be selected within a 60 second period of dropping below temperature threshold 210. Whereas, if the steps are repeated every 1 second deactive humidification mode will be selected within a 1 second period following the drop below temperature threshold 210. To limit chattering (i.e., repeated cycling between active and deactive humidification mode) a dead band above and below the threshold can be implemented or the cycle rate for steps S1-S5 can be slowed. Alternate control algorithms can also be selected to ensure fast and stable controlled functionality, including proportional feedback, proportional-integral feedback, proportional-integral-differential feedback as well as model-based or feed-forward arrangements.

In an alternate embodiment, selecting active or deactive humidification mode for power system 100 can be based on the cathode out stream 160 humidity. The humidity of the cathode outlet stream 160 can correlate to the PEM 113 level of self humidification. For example, a reading of high humidity from the cathode outlet stream 160 can indicate adequate self humidification of PEM 113. Whereas, a reading of low or nearly zero humidity from the cathode outlet stream 160 can indicate inadequate self humidification of PEM 113. Therefore, a humidity threshold for the cathode outlet stream 160 humidity can be calculated. The humidity threshold can represent the humidity level for the cathode outlet stream 160 at which self humidification of PEM 113 is no longer adequate. Similarly to controlling based on temperature, when the humidity threshold is reached active humidification mode can be selected to supply additional humidity to PEM 113 by humidifying cathode inlet stream 170.

In another embodiment, selecting active or deactive humidification mode for power system 100 can be based on a cell resistance measurement. The cell resistance of the fuel cell 110 can correlate to the PEM 113 level of self humidification. For example, when PEM 113 is fully hydrated because self humidification is adequate the conductivity of PEM 113 is optimal and the cell resistance is minimal. Whereas, if PEM 113 is not fully hydrated because self humidification of PEM 113 is not adequate then conductivity of PEM 113 will be reduced and cell resistance will be increased. Therefore, a cell resistance threshold for fuel cell 110 can be calculated. The resistance threshold can represent the cell resistance at which self humidification of PEM 113 is no longer adequate. Like controlling based on humidity and temperature, when the resistance threshold is reached, active humidification mode can be selected to supply additional humidity to PEM 113 by humidifying cathode inlet stream 170. The additional humidity can fully saturate PEM 113 and enable PEM 113 to maintain conductivity and limit the increase in cell resistance.

In various embodiments, humidification management can comprise selecting active or deactive humidification mode based on a combination of the temperature threshold, the humidity threshold, and the cell resistance threshold. For example, selecting active humidification mode can be based on the cell resistance exceeding the cell resistance threshold and selecting deactive humidification mode can be based on the fuel cell operating temperature dropping below the fuel cell temperature. In addition, thresholds based on a fuel cell coolant temperature, a fuel cell cathode outlet stream temperature, a fuel cell power output, a fuel cell load, or an ambient temperature can be utilized for humidification management. The thresholds can be utilized in variety of combinations to maximize efficiency.

The fuel cell parameter thresholds can be calculated in a variety of ways. For example, a calibration process can be run for each fuel cell 110 or power system 100 to determine the threshold for each parameter. The calibration process can be run just once at initial startup of the fuel cell 110 or it may be run repeatedly at a varying frequency to ensure compensation for any degradation of the power system 100 components. In addition, equations for calculating the thresholds based on the design of the fuel cell 110 can be developed. The equations can be used to generate look-up tables that take into account the ambient temperature and power output of fuel cell 100. Finally, the thresholds can be calculated based on empirical operating data, which can be collected during initial testing/startup or can take place continuously during operation.

Humidification of cathode inlet stream 170 by humidification device 130 when active humidification mode is selected can be accomplished in a variety of ways. The following embodiments comprise different configurations for humidification device 130, in accordance with various embodiments.

Figure 4:
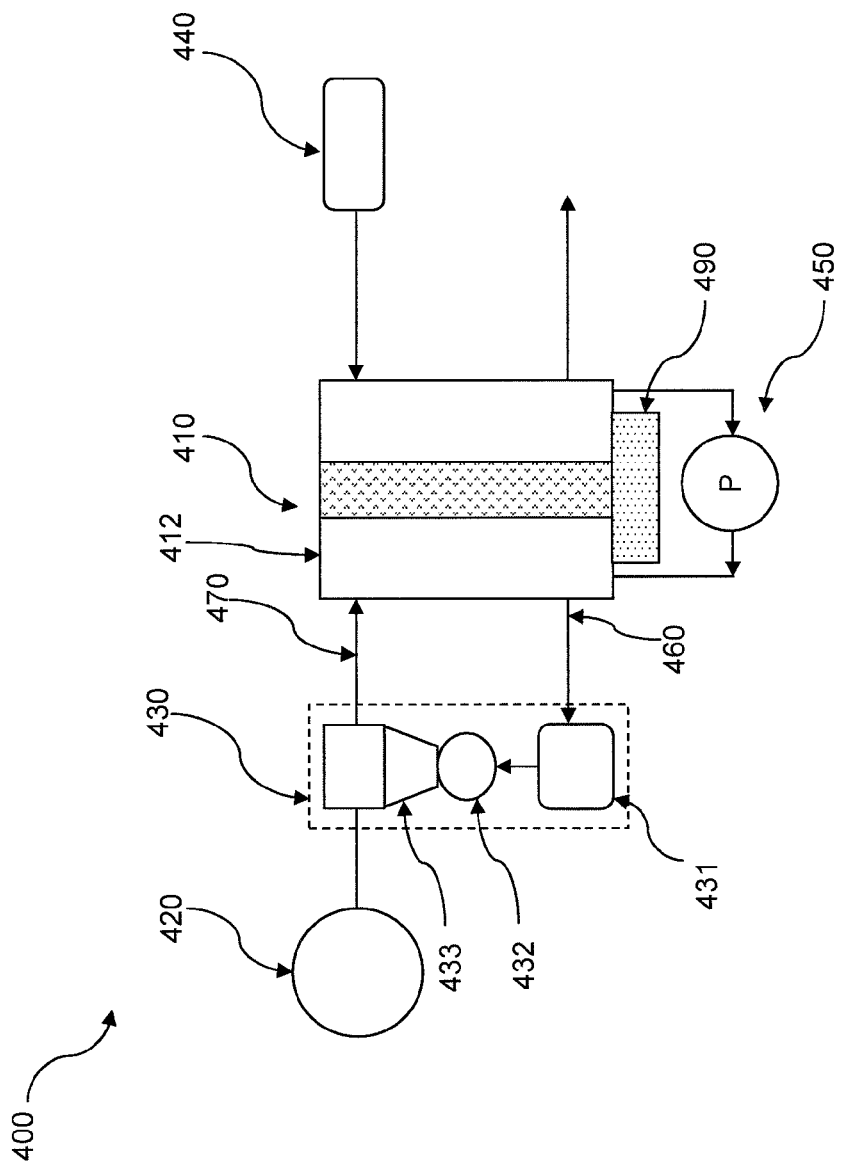
FIG. 4 is a schematic diagram of part of a fuel cell power system, according to an exemplary embodiment.

FIG. 4 is a schematic diagram of a power system 400, according to an exemplary embodiment. As in FIG. 1, power system 400 may comprise a fuel cell 410, an air supply 420, a humidification device 430, a fuel 440, an electric circuit 450, and a heat exchanger 490. The humidification device 430 can comprise a condenser 431, a pump 432, and a nozzle 433. As discussed in FIG. 1, water produced at a cathode 412 can be removed from fuel cell 410 by way of a cathode outlet stream 460. Cathode outlet stream 460 can supply condenser 431. Condenser 431 can condense the water vapor in cathode outlet stream 460 into liquid. The liquid in condenser 431 can be pulled or fed from the condenser 431 to pump 432. Pump 432 can pump the condensed water from condenser 431 through nozzle 433 into a cathode inlet stream 470. Pump 432 can be a centrifugal pump, diaphragm pump, metering pump, rotary lobe, progressive cavity, or equivalent. For various embodiments having binary control, pump can be energized by a motor starter having only on or off control. Pump 432, while on can pump water at a substantially constant flow. Pump 432 can be powered by electric circuit 450 or other power source.

Nozzle 433 can facilitate the mixing of the condensed water pumped from condenser 431 into the cathode inlet stream 470. The condensed water pumped through nozzle 433 mixes with air from air supply 420 before being pumped into cathode 412. The resulting mixture that is fed to cathode 412 has a higher level of humidity than that of air supply 420.

Selecting active or deactive humidification mode can comprise activating or deactivating humidification device 430, which can include activating or deactivating pump 432 and condenser 431. With pump 432 and condenser 431 deactivated, no water is pumped from condenser 431 through nozzle 433 into the cathode inlet stream. Therefore, when no water is pumped the humidity of the cathode inlet stream 470 can be substantially equal to the humidity of air supply 420.

Figure 5:
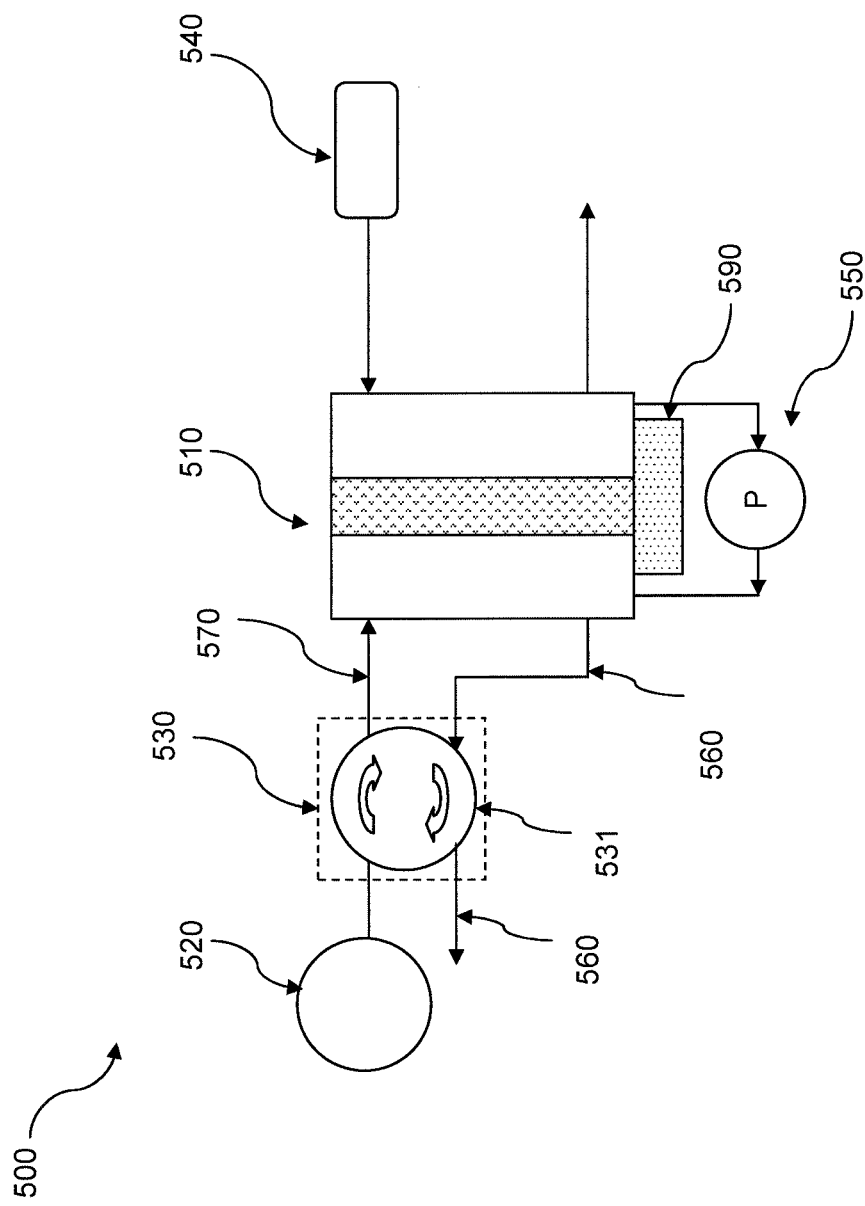
FIG. 5 is a schematic diagram of part of a fuel cell power system, according to an exemplary embodiment.

FIG. 5 is a schematic diagram of a power system 500, according to an exemplary embodiment. As in FIG. 1 and FIG. 4, power system 500 may comprise a fuel cell 510, an air supply 520, a humidification device 530, a fuel 540, an electric circuit 550, and a heat exchanger 590. Humidification device 530 can comprise an enthalpy wheel 531. Enthalpy wheel 531 can comprise a rotating cylinder made of air permeable material. For example, enthalpy wheel 531 can be constructed of ceramic honeycomb material. The material can have a desiccant coating which can increase the ability to absorb moisture and transfer that moisture from one stream to another stream. Enthalpy wheel 531 can rotate between cathode inlet stream 570 and cathode outlet stream 560. Rotation of enthalpy wheel 531 can be at a constant speed. Rotation can allow enthalpy wheel 531 to absorb the moisture exhausted in cathode outlet stream 560 and transfer that moisture to cathode inlet stream 570.

Selecting active or deactive humidification mode can comprise activating or deactivating humidification device 531, which can include activating or deactivating enthalpy wheel 531. With enthalpy wheel 531 deactivated, the wheel will not rotate and moisture is not transferred from cathode outlet stream 560 to cathode inlet stream 570.

In an alternate embodiment (not shown) cathode outlet stream 560 can be bypassed around enthalpy wheel 530 when deactive humidification mode is selected and humidification device 530 is deactive. Humidification device 530 can be configured such that a valve (not shown) diverts cathode outlet stream 560 and/or cathode inlet stream 570 around enthalpy wheel 330.

Figure 6:
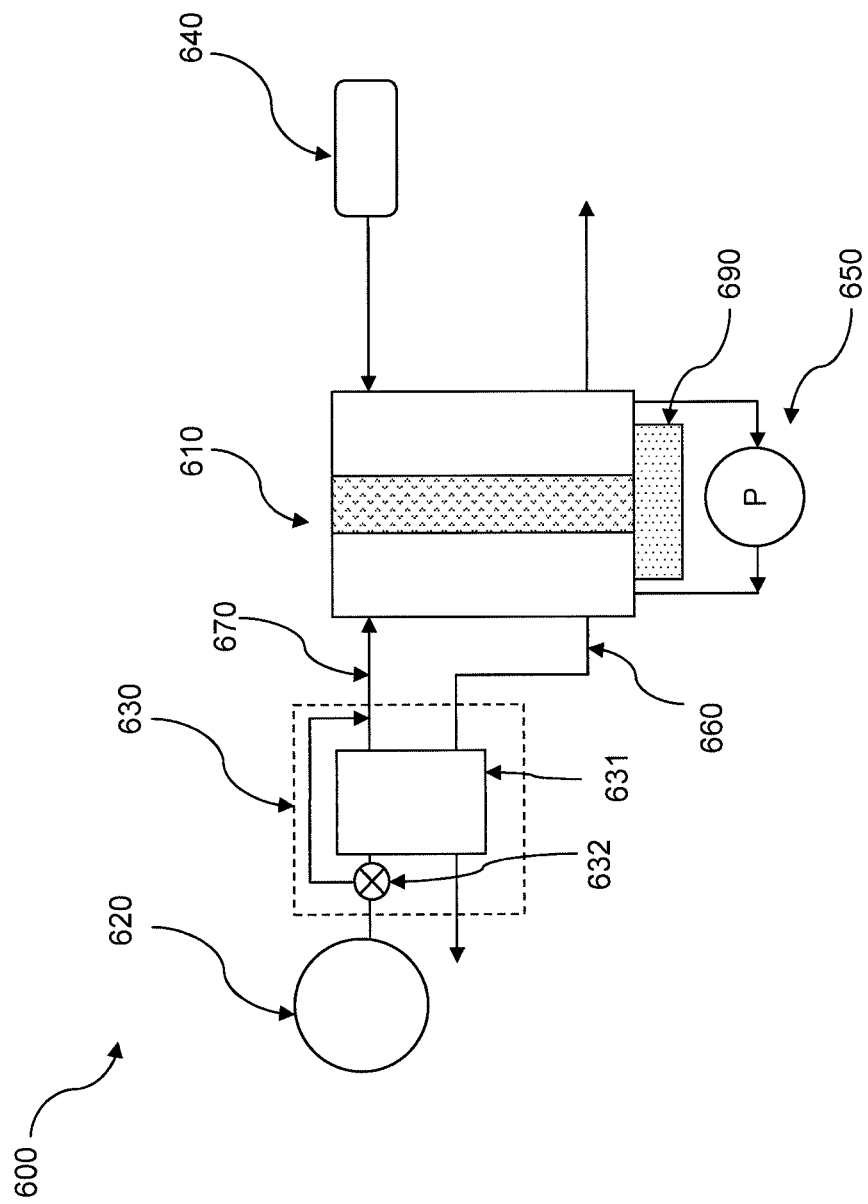
FIG. 6 is a schematic diagram of part of a fuel cell power system, according to an exemplary embodiment.

FIG. 6 is a schematic diagram of a power system 600, according to an exemplary embodiment. As in FIGS. 1, 4, and 5, power system 600 may comprise a fuel cell 610, an air supply 620, a humidification device 630, a fuel 640, an electric circuit 650, and a heat exchanger 690. The humidification device 630 can comprise a humidifier 631 and a valve 632. Humidifier 631 can comprise a water vapor transfer style humidifier. For example, humidifier 631 can comprise a planar or tubular membrane exchange humidifier. Humidifier 631 can receive flow from air supply 620 by way of valve 632. Flow received from valve 632 can pass through humidifier 631 and then be sent to fuel cell 610 by way of a cathode inlet stream 670. A cathode outlet stream 660 can exit fuel cell 610 carrying moisture formed by the cathode reaction and supply that moisture to humidifier 631. Within humidifier 631 the moisture from the cathode outlet stream 660 is transferred to the cathode inlet stream 670.

Valve 632 can be configured to divert flow of air supply 620 around the humidifier 631 and feed the cathode inlet stream 670 directly from air supply 620. Valve 632 can comprise a three way valve or a combination of valves coupled together or acting in combination. For various embodiments having binary control, valve 632 or the combination of valves can comprise two state valves, on/open or off/closed.

Figure 7:
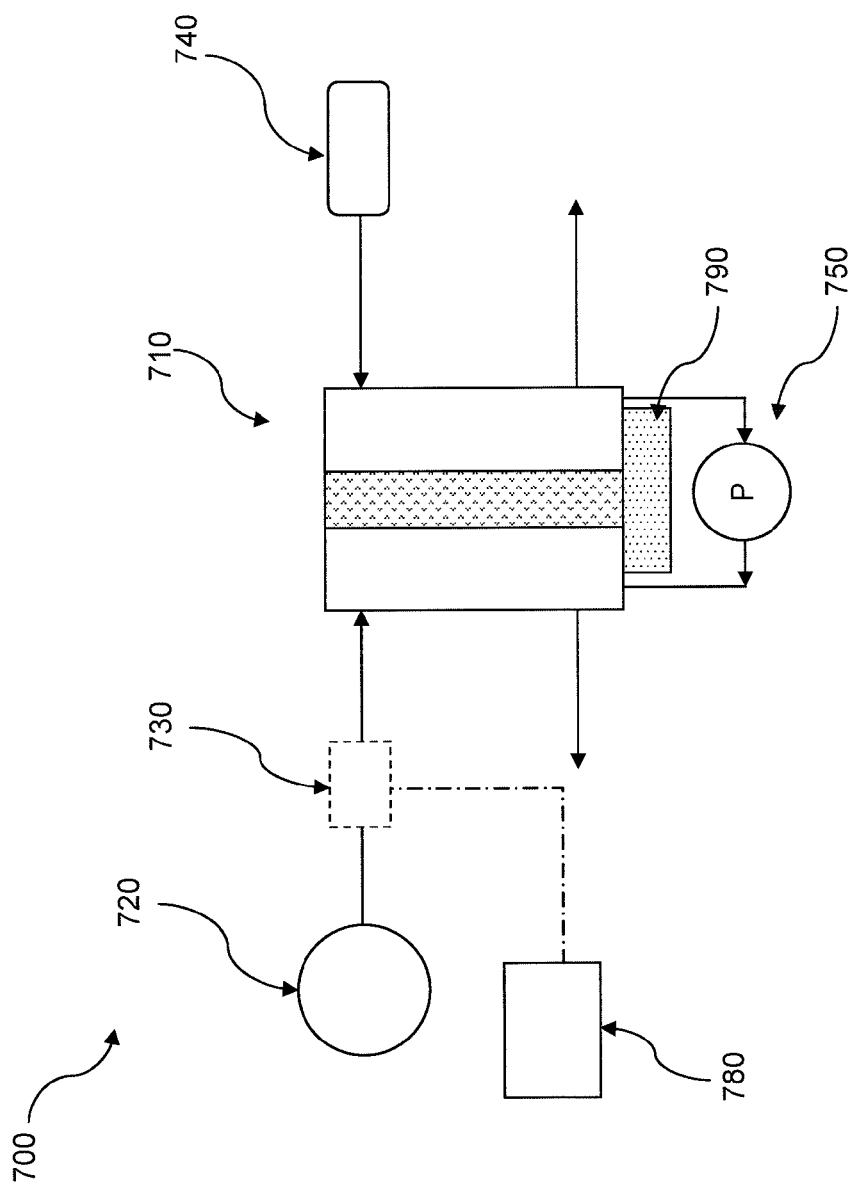
FIG. 7 is a schematic diagram of part of a fuel cell power system, according to an exemplary embodiment.

FIG. 7 is a schematic diagram of a power system 700, according to an exemplary embodiment. As in FIG. 1, 4-6, power system 700 may comprise a fuel cell 710, an air supply 720, a humidification device 730, a fuel 740, an electric circuit 750, and a heat exchanger 790. In addition to these components power system 700 can comprise a controller 780.

Controller 780 can perform steps S1-S5 shown in FIG. 3. Controller 780 can detect a fuel cell parameter that can be a fuel cell temperature, a fuel cell coolant temperature, a fuel cell cathode outlet stream temperature, a fuel cell load, an ambient temperature, a cathode outlet humidity, a fuel cell resistance, or a fuel cell power output. Controller 780 can calculate the fuel cell parameter thresholds or they can be programmed or transmitted into controller 780 by an external source. Controller 780 can compare at least one fuel cell parameter to at least one fuel cell parameter threshold. Based on the comparison, controller 780 can then activate or deactivate humidification device 730. In addition the cycle rate of steps S1-S5 can be programmed into or adjusted by controller 780.

Other embodiments of the present disclosure will be apparent to those skilled in the art from consideration of the specification and practice of the present disclosure. It is intended that the specification and examples be considered as exemplary only, with a true scope and spirit of the present disclosure being indicated by the following claims.

What is claimed is:

1. A method of managing humidification for a fuel cell power system, comprising:
   supplying air to a cathode inlet stream of a fuel cell;
   detecting a first fuel cell parameter associated with the humidity of the cathode inlet stream;
   detecting a second fuel cell parameter associated with the humidity of the cathode;
   calculating a first fuel cell parameter threshold and a second fuel cell parameter threshold; and
   selectively switching the fuel cell to an active humidification mode based on the first fuel cell parameter exceeding the first fuel cell parameter threshold, and switching the fuel cell to a deactive humidification mode based on the second fuel cell parameter dropping below the fuel cell parameter threshold, wherein the active humidification mode includes adding water to the cathode inlet stream and the deactive humidification mode includes adding no water to the cathode inlet stream.

2. The method of claim 1, wherein the active humidification mode adds a flow rate of water to achieve a relative humidity of the cathode inlet stream greater than about 49% when evaluated at the cathode inlet temperature.

3. The method of claim 1, wherein the active humidification mode comprises condensing water exiting the fuel cell from a cathode outlet stream, extracting the condensed water, and pumping the extracted water through a nozzle into the cathode inlet stream.

4. The method of claim 1, wherein the first fuel cell parameter and the second fuel cell parameter each include at least one of a fuel cell temperature, a fuel cell coolant temperature, a fuel cell outlet stream temperature, a fuel cell power output, a fuel cell load, a cathode outlet stream humidity, an ambient temperature, and a fuel cell resistance.

5. The method of claim 1, wherein the active humidification mode comprises directing the air through a membrane humidifier and into the fuel cell.

6. The method of claim 1, wherein the active humidification mode comprises rotating an enthalpy wheel.

7. The method of claim 1, wherein the deactive humidification mode comprises supplying ambient air to the cathode inlet stream.

8. The method of claim 5, wherein the deactive humidification mode comprises bypassing all the air around the membrane humidifier and directly into the fuel cell.

9. The method of claim 1, wherein the fuel cell generates more output power when in the active humidification mode than in the deactive humidification mode.

10. The method of claim 1, wherein the fuel cell operates at a higher temperature when in the active humidification mode than in the deactive humidification mode.

11. A fuel cell humidification management system, comprising:
an air supply conduit configured to supply air to a fuel cell;
a humidification device configured to supply a flow of water to the air supply conduit; and
a controller configured to:
detect a first fuel cell parameter associated with the humidity of the cathode inlet stream;
detect a second fuel cell parameter associated with the humidity of the cathode;
calculate a first fuel cell parameter threshold and a second fuel cell parameter threshold; and
selectively activate the humidification device based on the first fuel cell parameter exceeding the first fuel cell parameter threshold, and deactivate the humidification device based on the second fuel cell parameter dropping below the second fuel cell parameter threshold.

12. The system of claim 11, wherein the first fuel cell parameter and the second fuel cell parameter each include at least one of a fuel cell temperature, a fuel cell coolant temperature, a fuel cell outlet stream temperature, a fuel cell power output, a fuel cell load, a cathode outlet stream humidity, an ambient temperature, and a fuel cell resistance.

13. The system of claim 11, wherein the humidification device comprises a condenser, a pump, and a nozzle.

14. The system of claim 13, wherein the humidification device when activated by the controller is configured to turn on the condenser and the pump, to allow condensed water to flow from the condenser and be pumped through the nozzle into the cathode inlet stream.

15. The system of claim 11, wherein the humidification device comprises:
a membrane humidifier; and
a valve configured to direct the cathode inlet stream around the membrane humidifier and into a cathode of the fuel cell directly, bypassing the membrane humidifier.

16. The system of claim 11, wherein the humidification device comprises an enthalpy wheel configured to rotate when active and not rotate when deactive.

17. The system of claim 11, wherein the cathode inlet stream comprises ambient air when the humidification device is deactive.

18. The system of claim 11, wherein the controller is configured to calculate at least one of a threshold for the humidification device, and based on the threshold, activate or deactivate the humidification device.

19. The system of claim 11, wherein the controller is configured to detect the first fuel cell parameter or the second fuel cell parameter within a 60 second period during active and deactive humidification mode.

20. A fuel cell having a humidification management system, comprising:
an air supply;
a fuel cell comprising a cathode, an anode, and an electrolyte; and
a humidification device operated by a binary controller configured to:
detect a first fuel cell parameter associated with the humidity of the cathode inlet stream;
detect a second fuel cell parameter associated with the humidity of the cathode;
calculate a first fuel cell parameter threshold and a second fuel cell parameter threshold; and
selectively activate the humidification device based on the first fuel cell parameter exceeding the first fuel cell parameter threshold, and deactivate the humidification device based on the second fuel cell parameter dropping below the second fuel cell parameter threshold, wherein the humidification device is configured to humidify a cathode inlet stream generated by the air supply and fed to the cathode when in the active humidification mode.

21. The system of claim 20, wherein the first fuel cell parameter and the second fuel cell parameter each include at least one of a fuel cell temperature, a fuel cell coolant temperature, a fuel cell outlet stream temperature, a fuel cell power output, a fuel cell load, a cathode outlet stream humidity, an ambient temperature, and fuel cell resistance.

* * * * *